US012651124B2

(12) United States Patent
Rodgers

(10) Patent No.: US 12,651,124 B2
(45) Date of Patent: Jun. 9, 2026

(54) UPDATING A SENTIMENT ANALYSIS MODEL

(71) Applicant: Oracle International Corporation, Redwood Shores, CA (US)

(72) Inventor: Michael Patrick Rodgers, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 161 days.

(21) Appl. No.: 18/411,689

(22) Filed: Jan. 12, 2024

(65) Prior Publication Data

US 2025/0232124 A1     Jul. 17, 2025

(51) Int. Cl.
*G06F 40/35* (2020.01)
*H04L 51/02* (2022.01)

(52) U.S. Cl.
CPC .............. *G06F 40/35* (2020.01); *H04L 51/02* (2013.01)

(58) Field of Classification Search
CPC ........... G06F 40/35; G06F 40/30; H04L 51/02
See application file for complete search history.

(56) References Cited

U.S. PATENT DOCUMENTS

| | | |
|---|---|---|
| 9,369,410 B2 | 6/2016 | Capper et al. |
| 11,030,412 B2 | 6/2021 | Shanmugam et al. |
| 11,107,006 B2 | 8/2021 | Eisenzopf |
| 11,436,416 B2 | 9/2022 | Beaver |

| | | | |
|---|---|---|---|
| 11,893,356 B1 | 2/2024 | Yannam et al. | |
| 2017/0277993 A1* | 9/2017 | Beaver | G06Q 30/0201 |
| 2018/0165582 A1* | 6/2018 | Cha | H04L 51/52 |
| 2019/0052584 A1 | 2/2019 | Barve et al. | |
| 2021/0081819 A1 | 3/2021 | Polleri et al. | |
| 2022/0070296 A1 | 3/2022 | Friio | |
| 2022/0086108 A1 | 3/2022 | Higgins et al. | |
| 2023/0179708 A1* | 6/2023 | Klemm | H04M 3/5183 379/266.07 |
| 2023/0188480 A1* | 6/2023 | Menon | G06N 5/041 709/206 |
| 2023/0199118 A1 | 6/2023 | Koneru et al. | |

(Continued)

OTHER PUBLICATIONS

"Essential chatbot analytics 2024—ultimate guide", Retrieved from https://www.freshworks.com/chatbots/analytics/, Apr. 13, 2024, pp. 1-8.

(Continued)

*Primary Examiner* — Darioush Agahi
(74) *Attorney, Agent, or Firm* — Invoke

(57) ABSTRACT

Techniques for updating a sentiment analysis model in response to feedback for operations that are executed based on an output of the sentiment analysis model are disclosed. The sentiment analysis model analyzes a chat conversation to determine user sentiment. The system executes an operation based on the user sentiment determined by the sentiment analysis model. The operation may be the transfer of the chat conversation from a chatbot to a human agent or the generation of an outbound message by the chatbot. The system receives positive or negative feedback regarding the appropriateness and/or timeliness of the operation. The positive or negative feedback is attributed to the sentiment analysis model. The system generates training data using the feedback. The system then retrains the sentiment analysis model based on the training data.

14 Claims, 6 Drawing Sheets

(56) References Cited

U.S. PATENT DOCUMENTS

| | | | | |
|---|---|---|---|---|
| 2023/0410801 | A1* | 12/2023 | Mishra | H04L 51/02 |
| 2024/0089372 | A1 | 3/2024 | Kaniganti et al. | |
| 2024/0205335 | A1* | 6/2024 | Ramsay | G10L 15/22 |
| 2024/0305589 | A1* | 9/2024 | Dan | H04L 51/02 |
| 2024/0394285 | A1 | 11/2024 | Cunningham et al. | |
| 2025/0091221 | A1* | 3/2025 | Chiu | B25J 9/1697 |

OTHER PUBLICATIONS

"What is the Impact of Chatbot Sentiment Analysis on Your Customer Support Strategy?", Retrieved from https://www.ometrics.com/blog/what-is-the-impact-of-chatbot-sentiment-analysis-on-your-customer-support-strategy/, Retrieved on Mar. 31, 2025, pp. 1-14.
Jongerius C., "Quantifying Chatbot Performance by using Data Analytics", Jul. 16, 2018, 67 Pages.
Lee et al., "Investigation of Sentiment Controllable Chatbot", Jul. 11, 2020, pp. 1-13.
Lee et al., "Scalable Sentiment for Sequence-to-sequence Chatbot Response with Performance Analysis", Apr. 7, 2018, 5 Pages.
Zaranis et al., "EmpBot: A T5-based Empathetic Chatbot focusing on Sentiments", Oct. 30, 2021, 10 Pages.
Zhang et al., "Evaluating LLM-based chatbots: A comprehensive guide to performance metrics", Retrieved from https://medium.com/data-science-at-microsoft/evaluating-llm-based-chatbots-a-comprehensive-guide-to-performance-metrics-9c2388556d3e, Oct. 31, 2024, pp. 1-17.

* cited by examiner

System
100

FIG. 3A

UPDATING A SENTIMENT ANALYSIS MODEL

TECHNICAL FIELD

The present disclosure relates to a sentiment analysis model. In particular, the present disclosure relates to updating a sentiment analysis model based on feedback for operations triggered based on the sentiment analysis model.

BACKGROUND

Many businesses and organizations rely on chatbots to manage interactions with their clients and customers. Chatbots may incorporate a sentiment analysis model to predict and monitor sentiment of a user during a chat conversation between the user and the chatbot. The predicted user sentiment may be used by a chatbot, for example, to generate responses. Increased accuracy of the sentiment analysis models at predicting user sentiment improves the effectiveness of the chatbot. More particularly, accurately determining a sentiment of a user or changes to the sentiment of the user may improve how the chatbot interacts with the user. For example, the chatbot may generate a more empathic message in response to the sentiment analysis model indicating a sad user sentiment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A and 3B are activity diagrams illustrating dialogue of a chat conversation between a user and customer service.

DETAILED DESCRIPTION

Figure 1:
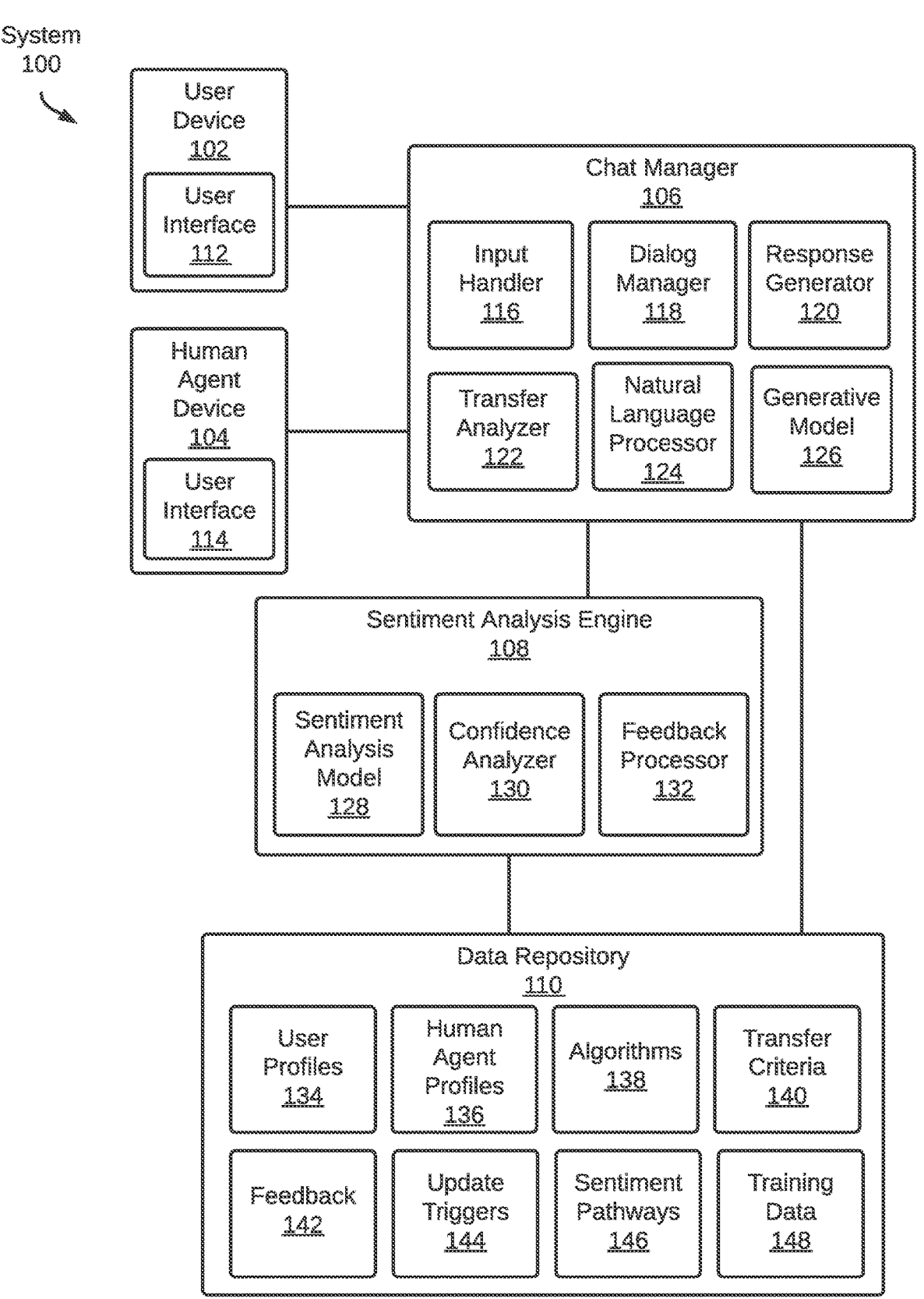
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CHATBOT SYSTEM INCORPORATING SENTIMENT ANALYSIS MODEL
3. UPDATING A SENTIMENT ANALYSIS MODEL USING FEEDBACK FOR OPERATIONS BASED ON PREDICTED USER SENTIMENT
4. EXAMPLE CHAT CONVERSATION
5. HARDWARE OVERVIEW
6. MISCELLANEOUS; EXTENSIONS

1. General Overview

One or more embodiments update a sentiment analysis model in response to feedback for operations that are executed based on an output of the sentiment analysis model. The sentiment analysis model analyzes a chat conversation to determine a sentiment of a user (referred to herein as "user sentiment"). The system executes an operation based on the user sentiment determined by the sentiment analysis model. The system receives positive or negative feedback regarding the appropriateness and/or timeliness of the operation. The positive or negative feedback is attributed to the sentiment analysis model. Positive feedback regarding the operation indicates that the sentiment analysis model made accurate user sentiment determinations that in turn led to the appropriate action. Negative feedback regarding the operation indicates that the sentiment analysis model made inaccurate user sentiment determinations that in turn led to the inappropriate or non-suitable action.

In an example, an operation involves transferring a chat conversation with a user from a chatbot to a human agent. The system triggers the transfer of a chat conversation with a user from a chatbot to a human agent based, at least in part, on the sentiment analysis model detecting a user sentiment that includes frustration or anger. If the system receives negative feedback indicating that the transfer was not necessary, the system determines that the user sentiment determined by the sentiment analysis model was incorrect. The system generates training data that includes (a) the conversation analyzed by the sentiment analysis model, and (b) a sentiment label that is different than anger or frustration, or simply identifies the sentiment as "not angry" and/or "not frustrated". The system then retrains the sentiment analysis model based on the training data set. If the system receives positive feedback indicating that the transfer was appropriate, the system may generate additional training data that further affirms the training of the sentiment analysis model. Specifically, the system generates training data that includes (a) the conversation analyzed by the sentiment analysis model, and (b) a sentiment label that identifies the user sentiment as anger or frustration. The system then retrains the sentiment analysis model based on the training data set. In another example, the operation may involve a system refraining from transferring a chat conversation with a user from a chatbot to a human agent. The system may receive positive or negative feedback regarding the lack of the transfer that is used to generate additional training data sets for retraining the user sentiment model.

In another example, an operation involves the transmission of a message generated by a chatbot during a chat conversation based on an output of the sentiment analysis model. The system receives feedback regarding the appropriateness or suitability of the message. Negative feedback regarding the message is attributed to an incorrect determination by the sentiment analysis model. Positive feedback regarding the message is attributed to a correct determination by the sentiment analysis model. The system generates additional training data based on the feedback and retrains the sentiment analysis model.

One or more embodiments described in this Specification and/or recited in the claims may not be included in this General Overview section.

2. Chatbot System Incorporating Sentiment Analysis Model

FIG. 1 illustrates a system 100 in accordance with one or more embodiments. As illustrated in FIG. 1, system 100 includes a user device 102, a human agent device 104, a chat manager or chatbot 106, a sentiment analysis engine 108, and a data repository 110. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user device 102 includes any device through which a user may communicate with the chat manager 106. The user device 102 may be a laptop computer, a desktop computer, a tablet, a smartphone or other mobile device, a smart TV or other internet ready device. The user device 102 may include a user interface 112 for engaging the chat manager 106. The user interface 112 renders user interface elements and receives input via user interface elements. Examples of interfaces include a graphical user interface (GUI), a command line interface (CLI), a haptic interface, and a voice command interface.

In embodiments, different components of user interface 112 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, user interface 112 is specified in one or more other languages, such as Java, C, or C++.

In one or more embodiments, the user interface 112 enables a user to enter messages for querying the chat manager 106 and receive messages from the chat manager 106 in response to the user queries for review. The user interface 112 may include interface elements corresponding to the responses provided by the chat manager 106. From a user's perspective, responses output to the user device 102 generated by the chat manager 106 are indistinguishable from responses provided to the user device 102 by a human agent. The interface elements may invite a user to provide their feedback concerning a particular response and/or the overall conversation. Feedback requested from the user may include rating user satisfaction of a response. Examples of user interface elements include checkboxes, radio buttons, dropdown lists, list boxes, buttons, toggles, text fields, date and time selectors, thumbs up/down icons, command lines, sliders, pages, and forms. The interface elements may include a chat interface allowing a user to type a comment related to a response. As will be described in further detail below, feedback provided by the user, whether related to a response generated by the chat manager 106 or a transfer of the chat conversation from the chat manager 106 to a human agent, may be collected and analyzed by the feedback processor 132 of the sentiment analysis engine 108. The feedback may be used for generating additional training data to be used for updating a sentiment analysis model 128 to predict user sentiment more accurately.

One or more embodiments include the human agent device 104 as a workstation operated by a human agent for monitoring one or more chat conversations. The human agent device 104 may include any device through which the human agent may communicate with the chat manager 106. The human agent device 104 includes a user interface 114 for engaging with the chat manager 106. The user interface 114 renders user interface elements and receives input via user interface elements. Examples of interfaces include a graphical user interface (GUI), a command line interface (CLI), a haptic interface, and a voice command interface.

In embodiments, different components of user interface 114 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, user interface 114 is specified in one or more other languages, such as Java, C, or C++.

In one or more embodiments, the human agent device 104 is able to provide audible and/or haptic alerts to the human agent. The audible and/or haptic alerts are provided to the human agent in addition to visual alerts. The volume and/or intensity of the alert may be determined by the severity of the issue for which the human agent is being alerted. For example, a significant change in user sentiment or a level of user sentiment exceeding a threshold level may be indicated by an increased audible alert, e.g., a loud ding, and/or an increased haptic alert, e.g., intense vibration of input device.

In one or more embodiments, the user interface 114 of the human client device 104 includes one or more displays that permit viewing of dialogue from one or more chat conversations. The human agent may choose between viewing dialogue of a single chat conversation or viewing dialogue of multiple chat conversations simultaneously. Individual chat conversations may be provided as individual tabs or windows that may be selected by the human agent to permit viewing of dialogue from the corresponding chat conversation. The displayed dialogue may include any dialogue of the chat conversations. The interface elements permit the human agent to scroll through the dialogue of the chat conversation to review earlier messages in the chat conversation. The display of the dialogue for the chat conversations on the user interface 114 may occur in real-time or near real-time.

In one or more embodiments, the user interface 114 displays user sentiment predicted by the sentiment analysis model 128 of the sentiment analysis engine 108. User sentiment may be displayed for the overall chat conversation and/or one or more of the user responses, i.e., inbound messages, of the chat conversation. A green background, text, highlight, or marker may be indicative of a positive user sentiment. A yellow background may be indicative of a neutral user sentiment. A red background may be indicative of a negative user sentiment. Changes in user sentiment predicted by the sentiment analysis engine 108 may be indicated by changing the color of the background or text or highlighting or markings. The background color may fade or grow brighter depending on the intensity of the user sentiment. The background and/or text color of the individual messages may change when user sentiment changes. The background or text color of the entire chat conversation may change to provide indication to the human agent that the sentiment has changed. The indication of change in sentiment may be accompanied by an audible and/or haptic alert to the human agent.

In one or more embodiments, the user interface 114 of the human agent device 104 includes interface elements that permit the human agent to modify the configuration of the chat manager 106 and/or the sentiment analysis engine 108. Interface elements for modifying the chat manager 106 and/or the sentiment analysis engine 108 may include checkboxes, radio buttons, dropdown lists, list boxes, buttons, toggles, text fields, date and time selectors, command lines, sliders, pages, and forms.

In some embodiments, modifications to the configuration of components of the chat manager 106 and/or sentiment analysis engine 108 are systemic and affect subsequent messages generated by the chat manager 106. Alternatively, modifications to the sentiment analysis model 128 of the sentiment analysis engine 108 may be user specific or directed to a category or class of users. For example, the sentiment analysis model 128 may be trained or retrained for intended use by users falling with a particular age range, e.g., 20-30, 50+, or from a particular area or region, e.g., Eastern Europe, Southeast Asia. The interface elements may provide the human agent the ability to regenerate a pending message generated by the chat manager 106, applying the most recent modifications to the chat manager 106 and/or the sentiment analysis engine 108.

In one or more embodiments, the interface elements include a chat box for the human agent to enter an internal note or comment for later use by the feedback processor 132 of the sentiment analysis engine 108. The user interface 114 may include interface elements for marking a response as exceptional. Exceptionally bad or nonsensical responses may be flagged by the human agent for further review and analysis. Comments related to the correctness of the response, the tone of the response, the reaction of the user to the response, the length of the response, or any other factor are collected by the feedback processor 132 of the sentiment analysis engine 108 to be used by the sentiment analysis engine 108 to update the sentiment analysis model 128.

In one or more embodiments, the chat manager or chatbot 106 refers to hardware and/or software configured to perform operations described herein for handling a service request. Examples of operations for handling a service request are described below with reference to FIGS. 2A and 2B. The chat manager 106 is a computer program designed to simulate human conversation and interact with users. As will be described in further detail below, the chat manager 106 uses user sentiment predicted by the sentiment analysis model 128 of the sentiment analysis engine 108 to increase the effectiveness of the chat manager 106 and to improve customer satisfaction.

In one or more embodiments, the chat manager 106 and sentiment analysis engine 108 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In embodiments, the chat manager 106 and sentiment analysis engine 108 are configured for a specific purpose or domain of focus, e.g., customer support, information retrieval, or task automation. Although the aspects of the disclosure will be described with reference to the use of the chat manager 106 and sentiment analysis engine 108 in a customer support role, the operation, analysis, and reporting of the chat manager 106 and sentiment analysis engine 108 may be applicable to other purposes.

Although each outbound message to the user device 102 is received from the chat manager 106, distinction is made between messages generated by the chat manager 106 and messages prepared by the human agent. Unless noted as being from the human agent, the messages output to the user device 102 are generated by one or more components of the chat manager 106.

In one or more embodiments, the chat manager 106 uses various techniques, including natural language processing, rule-based approaches, retrieval-based approaches, generative models, and sentiment analysis to generate natural language responses to natural language input from a user. Rules-based techniques rely on predefined rules or decision trees to generate responses. Retrieval-based techniques retrieve pre-existing responses from a knowledge base in response to input from the user. Generative models, e.g., ChatGPT, generate responses based on the learned patterns in a large corpus of text data. Sentiment analysis allows the chat manager to generate responses and act, e.g., initiate a transfer of the chat conversation to a human agent, based on the predicted sentiment of the user.

In one or more embodiments, the chat manager 106 uses a natural language processor 124 to understand user input, one or more generative models 126, e.g., GPT model, to generate appropriate responses, and the sentiment analysis engine 108 to predict user sentiment and initiate action based on the predicted user sentiment. The chat manager 106 may also include an input handler 116, a dialog manager 118, a response generator 120, and a transfer analyzer 122. Although some components are described as relating to the chat manager 106, the various components may belong to or be used by either or both chat manager 106 and the sentiment analysis engine 108.

In one or more embodiments, the input handler 116 of the chat manager 106 receives and processes user inputs received from the user device 102. The user input may be in the form of text messages, voice commands, or any other input format supported by the chat manager 106. The input handler 116 processes the user input, extracts relevant information, and performs initial intent recognition. The input handler 116 may be trained to understand the immediate intention of the user within the context of the current input.

In one or more embodiments, prior to processing the user input, the input handler 116 performs pre-processing steps to clean and normalize the input data. Pre-processing may include removing unnecessary characters, converting the input to lowercase, and applying other text normalization techniques. The input handler 116 may provide the cleaned and normalized input data to the sentiment analysis engine 108 to predict user sentiment.

In one or more embodiments, the input handler 116 applies intent recognition techniques to determine the type of service request and intention or purpose behind the service request. Although described as being performed by the input handler 116, intent recognition may be performed by a separate component or other component(s) of the chat manager 106 and/or the sentiment analysis engine 108.

In one or more embodiments, the dialog manager 118 of the chat manager 106 is responsible for managing the flow and context of the chat conversation. The dialog manager 118 may handle tasks such as maintaining the state of the conversation, tracking user preferences or context, and making decisions about the responses generated by the chat manager 106 based on the recognized intent. The dialog manager 118 may use the recognized intent, along with conversation context and user sentiment provided by the sentiment analysis engine 108, to determine appropriate next steps, such as selecting an appropriate response, invoking specific services, or routing the chat conversation to different parts of the system 100.

In one or more embodiments, intent recognition focuses on identifying the intention of a user based on the input. Intent recognition considers the broader conversation context, including the history of user inputs and responses as well as user sentiment provided by the sentiment analysis engine 108 to understand the intent within the context of the ongoing chat conversation. Intent recognition may assist in determining the appropriate action or response based on the recognized intent.

In one or more embodiments, the response generator 120 of the chat manager 106 generates appropriate responses to user inputs or queries. The response generator 120 maintains the conversational flow of the chat conversation by generating relevant and contextually appropriate responses. The response generator 120 accounts for various factors in generating effective responses, including intent of the user, current conversation context, user sentiment, available knowledge or information, and any predefined rules or guidelines.

In one or more embodiments, the response generator 120 considers the intent of the user that represents the purpose or goal behind the user's input. The response generator 120 may also consider the sentiment of the user provided by the sentiment analysis engine 108 that represents the feelings or emotion of the user predicted from the user's input. Use of intent recognition techniques to identify the intention of a user allows the response generator 120 to generate a response that aligns with the service request. Use of sentiment analysis techniques to identify the sentiment of the user allows the response generator 120 to generate a response that accounts for the emotional state of the user.

In one or more embodiments, the response generator 120 accounts for context of a conversation. The response generator 120 may consider the history of the chat conversation, including previous user inputs and responses from the chat manager 106 and changes in user sentiment predicted by the sentiment analysis engine 108 to ensure that the generated response is relevant and coherent with the ongoing dialogue of the chat conversation. Context awareness may assist in maintaining a smooth and coherent conversation flow and increased customer satisfaction.

In one or more embodiments, the transfer analyzer 122 of the chat manager 106 analyzes a chat conversation between a user and the chat manager 106 and determines if a transfer criteria is met. The transfer analyzer 122 assesses context of a chat conversation and determines whether to transfer control of the chat conversation to the human agent based on specific transfer criteria. The transfer analyzer 122 may monitor and analyze the ongoing chat conversation, considering various factors such as intent of the user, complexity of the inquiry, confidence in a generated response, sentiment of the user, and/or predefined rules. The transfer analyzer

122 may define the criteria or conditions that need to be met for a transfer to occur. The transfer criteria may include a request by the user for human assistance, an inability by the chat manager 106 to provide a satisfactory response, identification of specific keywords or triggers indicating the need for specialized knowledge or escalation, and/or user sentiment or perceived state of being of the user as predicted by the sentiment analysis engine 108.

In one or more embodiments, based on the analysis of the conversation and transfer criteria 140, the transfer analyzer 122 determines when the conversation should be transferred to a human agent. When transfer criteria 140 is met, the chat conversation may be automatically transferred from control of the chat manager 106 to control of a human agent. The transfer of the chat conversation to the human agent may be initiated by the transfer analyzer 122. Alternatively, when transfer criteria 140 is met, the human agent may be provided with indication that the transfer criteria has been met, and the human agent may initiate the transfer of the chat conversation with the user from the chat manager 106 to themselves.

In one or more embodiments, the natural language processor 124 of the chat manager 106 is a tool or system that enables the chat manager 106 to understand, interpret, and process input from the user device 102 in a way that is similar to how humans process information. Natural language processing involves the application of computational techniques and algorithms to analyze and extract meaning from natural language text or speech.

In one or more embodiments, the generative model 126 of the chat manager 106 is a type of artificial intelligence (AI) model that utilizes deep learning techniques to generate human-like text based on the input the model receives, e.g., generative pre-trained transformer (GPT). The generative model may be trained on large amounts of text data and is able to generate coherent and contextually relevant responses. Specific implementations and variations of the generative model differ depending on the model and the intended application. The generative model 126 may include several components that work together to generate coherent and contextually relevant text.

In one or more embodiments, the sentiment analysis engine 108, also referred to as opinion miner, monitors the chat conversation and determines the sentiment or subjective information expressed in a piece of text. The sentiment analysis engine 108 may include a sentiment analysis model 128, a confidence analyzer 130, and a feedback processor 132. Alternatively, the components of the sentiment analysis engine 108 may be components of the natural language processor 124 or other component of the chat manager 106. Sentiment analysis includes analyzing and classifying the underlying user sentiment as positive, negative, or neutral. The goal of sentiment analysis is to extract insights from text data by understanding the sentiment or opinion expressed by users.

In one or more embodiments, the sentiment analysis model 128 of the sentiment analysis engine 108 uses various techniques, including lexicon-based analysis, machine learning approaches, deep learning and neural networks, and rule-based approaches to analyze sentiment of dialogue. Lexicon-based sentiment analysis may include using predefined dictionaries or lexicons of words or phrases with assigned sentiment scores. Each word or phrase is associated with a sentiment polarity, such as positive, negative, or neutral. The sentiment analysis engine 108 scans the user input provided by the input handler 116 for words present in the lexicon and calculates an overall sentiment score based on the sentiment values of those words. The sentiment score can indicate the overall positive, negative, or neutral sentiment of the input.

In some embodiments, the sentiment analysis engine 108 uses machine learning algorithms trained to classify the sentiment of a given text using supervised learning techniques. Supervised learning techniques involve training the model on labeled data, where each input is annotated with the corresponding sentiment. The model may learn patterns and features from the training data and predicts the sentiment of unseen text. The sentiment analysis engine 108 can use a trained model to classify user inputs and determine the sentiment.

In one or more embodiments, deep learning techniques, including recurrent neural networks (RNNs) or transformers, are employed by the sentiment analysis engine 108. These models capture the contextual information and semantic meaning of text. The models are trained on large labeled datasets to learn sentiment patterns and, using the learned sentiment patterns, classify the sentiment of user inputs.

In one or more embodiments, rule-based sentiment analysis includes defining specific rules or patterns that indicate sentiment in text. The rules are based on linguistic features, grammatical structures, or known sentiment triggers. The sentiment analysis engine 108 applies these rules to analyze the user input and determines the sentiment based on the presence or absence of specific patterns.

One or more embodiments use machine learning algorithms, such as Naive Bayes, support vector machines (SVM), or Neural Networks, trained on labeled datasets. These algorithms learn patterns from the labeled data and create models to classify text into positive, negative, or neutral sentiment categories. The trained model is applied to new, unseen text data to predict the sentiment. The model assigns a sentiment label to each text instance based on its learned patterns and features.

In one or more embodiments, user sentiment is tracked as a combination of sentiment polarity (positive or negative) and sentiment magnitude (or intensity). Sentiment polarity indicates whether the sentiment expressed in a piece of text of a chat conversation is positive, negative, or neutral. For example, positive sentiment is represented as a positive number, e.g., 0.8 or 1; negative sentiment is represented as a negative number, e.g., −0.6 or −1; and a neutral sentiment is represented as 0 or a value close to 0. Sentiment magnitude or intensity measures the strength or degree of sentiment expressed in the text of a chat conversation. Common representations of sentiment magnitude include a normalized scale, e.g., a value between 0 and 1, where 0 represents no sentiment or neutral, and 1 represents the highest intensity of sentiment, or a larger scale, e.g., a value of between 0 and 10, where 0 is no sentiment, and 10 is the highest intensity. Tracking sentiment polarity and magnitude allows for more nuanced insights into the sentiment of the text data. For example, a text with a positive sentiment polarity, e.g., 0.8, and a high sentiment magnitude, e.g., 0.9 on a normalized scale or 9 on a 0-10 scale, indicates very strong positive sentiment, while a text with a positive sentiment polarity, e.g., 0.6, and a low sentiment magnitude, e.g., 0.2 on a normalized scale or 2 on a 0-10 scale, suggests mild or weak positive sentiment.

In one or more embodiments, the sentiment analysis engine 108 identifies specific emotions conveyed in the chat conversation, including joy, anger, sadness, fear, surprise, disgust, and anticipation. Sentiment analysis may also determine the degree of subjectivity in the chat conversation, i.e., the extent to which the text expresses opinions, beliefs, or personal viewpoints rather than objective facts. The sentiment analysis engine 108 may identify specific targets or entities to which the sentiment refers. For example, the sentiment analysis engine 108 may identify whether the sentiment is about a product, a service, a person, or a brand.

In one or more embodiments, different sentiments can be detected for different pieces of text within a single message or within a single chat conversation comprising multiple messages. The subset of text having a particular sentiment may be color-coded, flagged, labeled, or graphically indicated with an icon or otherwise. Identifying the different sentiments in this manner allows the human agent to easily see (a) the user sentiment, and (b) the topic, question, problem, or issue to which the portion of text relates. This may include a sub-topic(s), a sub-question(s), or a sub-issue(s) from the overall conversation with the chat manager 106. The sentiment and topic might be represented by different modes of graphical indication, so the human agent can easily visualize topics on the chat conversation and changes in user sentiment in the chat conversation.

In one or more embodiments, when the sentiment analysis engine 108 determines the user sentiment is positive, the chat manager 106 generates responses that may include positive reinforcement, acknowledgment, or appreciation. When the sentiment analysis engine 108 determines the user sentiment is negative, the chat manager 106 may generate responses that includes empathy, apology if necessary, and may offer solutions to address the concerns of the user. When the sentiment analysis model 128 determines the user sentiment is neutral or ambiguous, the chat manager 106 may ask for clarification or may provide general information to guide the chat conversation. When the sentiment analysis engine 108 determines that the user is agitated or emotional, the chat manager 106 may use calming language or suggests taking a break before continuing the chat conversation.

In one or more embodiments, when the sentiment analysis engine 108 and/or human agent determines that a response generated by the chat manager 106 elicited an unexpected or surprising user sentiment, this portion of the chat conversation is flagged, either automatically by the sentiment analysis engine 108 or manually by the human agent or other personnel for later review. For example, the response generated by the chat manager 106 may have been a good first step but did not resolve the issue, or the user does not possess the expertise or knowledge or time to figure out the response. In another example, the response was the correct response, and the user did not like the response, i.e., an inquiry from a user regarding a return policy in which the period for returning an item has lapsed. When the sentiment analysis engine 108 determines that the user sentiment in response to the response generated by the chat manager 106 is significantly different than what would be expected, the sentiment analysis engine 108 flags this portion of the chat conversation for later review.

In one or more embodiments, the confidence analyzer 130 of sentiment analysis engine 108 is a tool or system that assesses the level of confidence or certainty of predictions made by the sentiment analysis model 128. The confidence analyzer 130 determines a score indicating a level of confidence for user sentiment predicted by the sentiment analysis model 128 for an inbound message, a collection of inbound messages, or for the overall chat conversation. A high confidence score indicates a strong level of certainty in the predicted user sentiment, while a low confidence score suggests a low level of confidence in the predicted user sentiment.

In one or more embodiments, confidence scores are determined by comparing the conversation pattern with conversation patterns identified as corresponding to a particular sentiment. When the conversation pattern for a response (a) matches or (b) is similar to conversation patterns that are identified as corresponding to a particular sentiment, the confidence score will be higher. As the conversation pattern moves away from known conversation patterns, the confidence score drops. In some instances, a response may receive a confidence score of zero or not be given a confidence score because the conversation pattern could not be matched to any conversation pattern with a known sentiment.

In one or more embodiments, inbound messages with high confidence scores for predicted user sentiment are used to predict user sentiment for inbound messages with predicted user sentiment having low confidence scores or an unpredictable user sentiment. Generally, user sentiment changes as a function of time. User sentiment for a target inbound message(s) will most likely be between user sentiment predicted for an inbound message(s) received prior to the target inbound message(s) and a user sentiment predicted for an inbound message(s) received after the target inbound message(s). In this manner, when the predicted user sentiment for the target inbound message(s) has a low confidence score, the user sentiment for the target inbound message may be inferred from the user sentiment predicted for the inbound message(s) received before and after receipt of the target inbound message. The higher the confidence scores of the user sentiment for the first and third inbound messages, the greater the accuracy of the inferred user sentiment for the second or target inbound message(s).

In an example, a first inbound message or group of messages has a user sentiment of 0.9 with a high confidence score. The sentiment analysis model 128 is unable to predict a user sentiment for a second or target inbound message or group of messages. A third inbound message or group of messages has a user sentiment of 0.4 with a high confidence. User sentiment for the second or target inbound message or group of messages may be inferred from the first and third inbound message or groups of messages. In this example, the user sentiment for the second or target inbound message is between 0.9 and 0.4.

In one or more embodiments, various factors may be used to infer a user sentiment for the second or target inbound message(s). The timing of receipt and responding to messages may be used to adjust the inferred user sentiment. For example, when the third outbound message(s) is received from the user immediately after the chat manager 106 sends an outbound message in response to the second or target inbound message(s), the sentiment analysis model 128 may adjust the inferred user sentiment towards the user sentiment for the third inbound massage(s). Conversely, if the third inbound message is received a significant time after sending the outbound message, the sentiment analysis model 128 may adjust the inferred user sentiment toward the user sentiment for the first inbound message(s)

In one or more embodiments, confidence scores for predicted user sentiment may be used to identify and flag predicted user sentiment that is unexpected or surprising. The confidence analyzer 130 may continuously monitor the confidence scores of user sentiment throughout a chat conversation. For example, when user sentiment for a target inbound message is not between user sentiment for an inbound message received before the target inbound message and user sentiment for an inbound message received after the target inbound message, the sentiment analysis engine 108 may flag the target inbound messages for future review and analysis.

In one or more embodiments, the feedback processor 132 of the sentiment analysis engine 108 is a tool or system for processing and analyzing feedback for the operation executed by the system 100, i.e., generated outbound message or transfer of chat conversation, based on the user sentiment predicted by the sentiment analysis model 128 of the sentiment analysis engine 108. Feedback collected by the feedback processor 132 may be provided by the user, the human agent receiving the transfer of the chat conversation, or other reviewers of the chat conversation.

In embodiments, the user provides feedback in real-time using various interface elements described above. Alternatively, or additionally, the user may provide feedback in, for example, the form of a response to a query to the user provided to the user corresponding to various events throughout the chat conversation, e.g., when the chat conversation is transferred from the chat manager 106 to the human agent or at the end of the chat conversation. A survey may be provided to the user at the completion of the chat conversation and/or as a follow up at a later time. When the user's feedback is provided may be taken into consideration when assessing the accuracy of the user's recollection and their sentiment regarding the chat conversation. For example, feedback received in real-time may include the added emotion of the frustration or annoyance experienced during the chat conversation, while feedback received in a follow up survey regarding the chat conversation received at a later time may be less influenced by the emotion felt by the user at the time of the chat conversation. The human agent associated with the chat conversation and/or other reviewers of the chat conversation may provide feedback for operations executed by the system 100 based on the user sentiment predicted by the sentiment analysis model 128 during or after the chat conversation. The feedback provided by the human agent and/or other personnel may be provided using various interface elements.

In one or more embodiments, the analysis of the feedback is manual, i.e., involving human review and interpretation. Alternatively, or additionally, the analysis of the feedback is automated, i.e., utilizing software and algorithms. The feedback processor 132 may utilize natural language processing techniques to extract meaning from text-based feedback, categorize sentiments, and identify key themes or issues raised by the feedback. The feedback processor 132 may group feedback into categories based on demographics of the user obtained from the user profiles 134. Demographics may include, for example, age of the user, geographic location of the user, and educational level of the user. The human agent profiles 136 may be used by the feedback processor 132 to understand the perspective from which the human agent is reviewing the messages of the chat conversation and how that perspective may affect the feedback provided by the human agent.

In one or more embodiments, the feedback processor 132 uses the feedback provided by the user, the human agent and/or other reviewers to identify patterns and common words or phrases from the chat conversation or across multiple chat conversations. Using the patterns and common words or phrases identified during the analysis of the feedback, the feedback processor 132 may generate additional training data. The additional training data is used by the sentiment analysis engine 108 for further training and fine-tuning the sentiment analysis model 128 and/or other components of the chat manager 106.

In one or more embodiments, the data repository 110 is any type of storage unit and/or device (e.g., a file system, database, collection of tables, or any other storage mechanism) for storing data. Further, a data repository 110 may include multiple different storage units and/or devices. The multiple different storage units and/or devices may or may not be of the same type or located at the same physical site. Further, the data repository 110 may be implemented or executed on the same computing system as the chat manager 106 and/or sentiment analysis engine 108. Alternatively, or additionally, a data repository 110 may be implemented or executed on a computing system separate from the chat manager 106 and/or the sentiment analysis engine 108. The data repository 110 may be communicatively coupled to the chat manager 106 and/or the sentiment analysis engine 108 via a direct connection or via a network.

Information describing the user profiles 134, the human agent profiles 136, the algorithms 138, the transfer criteria 140, the feedback 142, the update triggers 144, the sentiment pathways 146, and the training data 148 may be implemented across any of components within the system 100. However, this information is illustrated within the data repository 110 for purposes of clarity and explanation.

In embodiments, the data repository 110 includes the user profiles 134 for individuals who have conversed with or are actively conversing with the chat manager 106. The user profiles 134 may include profiles of potential users, e.g., customers, members, subscribers, clients, patients, employees, family members of a business, an organization, an industry, or other entities for which the chat manager 106 is intended to provide support.

In one or more embodiments, the user profiles 134 provide information relating to the user that the sentiment analysis engine 108 can use to improve sentiment analysis of the user during the chat conversation. The user profiles 134 may include demographic information of the user, including age, race, religion, ethnicity, country of birth, marital status, number of children, if any, and geographic locations, e.g., current, or prior residence. In this manner, the information provided in the user profiles 134 may be useful when updating the sentiment analysis model 128 for specific categories of users, i.e., users within a particular age range or from a particular geographic region. For example, users from a particular country or region may use the expression "having doubt" to mean having a question as opposed to being skeptical. The user profiles 134 may also assist in improving an understanding of the context of any feedback provided by the user.

In some embodiments, the data repository 110 includes human agent profiles 136 for the human agents handling chat conversations. The human agent profiles 136 may include demographic information of the human agents, including age, race, religion, ethnicity, country of birth, marital status, number of children, if any, and geographic locations, e.g., current, or prior residence. The information provided in the human agent profiles 136 may provide context for the feedback provided by the human agents. For example, a human agent with a native language other than that of the user might not be familiar with a particular word usage. Similarly, a human agent that is foreign born or significantly older or younger than the user may not be aware of changes in grammar or syntax particular to a region, culture, or age group. When the user and the human agent share similar demographics, the feedback provided by the human agent may be more relevant than when the user and the human agent do not share similar demographics. Differences in demographics between the user and the individual providing feedback may be considered when analyzing the feedback and generating additional training data.

In one or more embodiments, the algorithms 138 in the data repository 110 are machine learning algorithms that can be iterated to learn a target model f that best maps a set of input variables to an output variable using a set of training data 148. The training data includes datasets and associated labels. In embodiments, the datasets are associated with input variables for the target model f. The associated labels are associated with the output variable of the target model f. The training data 148 may be updated based on, for example, feedback on the accuracy of the current target model f. Updated training data is fed back into the machine learning algorithm that in turn updates the target model f.

In one or more embodiments, the algorithms 138 generate a target model f such that the target model f best fits the datasets of training data 148 to the labels of the training data 148. Additionally, or alternatively, the algorithms 138 generate a target model f such that when the target model f is applied to the datasets of the training data 148, a maximum number of results determined by the target model f matches the labels of the training data 148. In embodiments, different target models are generated based on different machine learning algorithms and/or different sets of training data 148.

In one or more embodiments, the algorithms 138 include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, the transfer criteria 140 for initiating a transfer of a chat conversation from the chat manager 106 to a human agent include detecting situations in which the chat manager 106 is no longer able to make progress in advancing the service request to resolution or situations that are determined to require human intervention. The transfer criteria 140 may include determining that the service request is overly complex or involves multiple topics. The transfer criteria 140 may include the inability of the chat manager 106 to determine the intent of the user, i.e., ambiguous language or context. The transfer criteria 140 may include determining that the user is expressing strong emotions or is discussing sensitive topics. As described above, sentiment analysis may be used to determine the emotional state of the user. The transfer criteria 140 may include determining that the overall sentiment of the user falls below or exceeds a first threshold level or that the overall sentiment of the user remains below or exceeds a second threshold level for a particular length of time or for a certain number of responses.

In one or more embodiments, the transfer criteria 140 is adjusted based on user feedback, analytics, and continuous monitoring of the performance of the chat manager 106 and the sentiment analysis model 128 of the sentiment analysis engine 108 to find a proper balance between automation and human intervention for the best customer experience.

In one or more embodiments, the feedback 142 in the data repository 110 is feedback associated with the predicted user sentiments during chat conversations. Feedback 142 may be provided by users, human agents, and/or other reviewers of the chat conversations. Alternatively, or additionally, feedback 142 may be provided by machine learning models. Feedback 142 may relate to particular aspects of the conversation. Feedback 142 may be regarding the appropriateness and/or timeliness of an operation. For example, feedback 142 may relate to (a) when a chat conversation is transferred, (b) one or more outbound messages generated by the chat manager 106, or (c) one or more inbound messages provided by the user. Feedback 142 may be received in real-time, near real-time, or at a later time. The feedback received may be positive or negative. Positive feedback regarding the operation indicates that the sentiment analysis model 128 accurately determined the user sentiment that led to appropriate action. Negative feedback regarding the operation indicates that the sentiment analysis model 128 inaccurately determined the user sentiment that led to inappropriate action.

In one or more embodiments, the update triggers 144 in the data repository 110 are events or changes in the system that prompt the sentiment analysis engine 108 to retrain or update the sentiment analysis model 128. The choice of update triggers 144 depends on the specific requirements of the application and the nature of the data being analyzed. The update triggers 144 may include new labeled data, concept drift detection, user feedback integration, domain-specific events, change in user behavior, performance metrics, data quality improvements, regulatory changes, feature engineering enhancements, and model expandability insights. A significant amount of new labeled data, i.e., text samples with corresponding sentiment labels, becoming available may trigger an update. Similarly, receipt of negative feedback for transfers of a set of chat conversations that meet a similarity criteria may trigger an update. When the sentiment analysis engine 108 detects a significant change in the distribution of incoming data (concept drift), an update may be triggered to adapt the sentiment analysis model 128 to the new patterns or trends. The update triggers 144 may include when a threshold of dissatisfaction is reached. In sentiment analysis for specific domains, e.g., finance, healthcare, the update triggers 144 may include events significantly impacting the language used in the domain, including major events or shifts in sentiment within the domain. The update triggers 144 may include detection of the way users express sentiment over time, e.g., due to cultural shifts or evolving language trends. The update triggers 144 may be related to performance, including, for example, a detection of a decline in performance metrics, such as accuracy, precision, recall, and F1 score. Updates may be triggered when there are improvements in the quality of labeled data, for example, if errors in the annotation process are corrected or if more accurate sentiment labels become available. Update trigger 144 may include changes in regulations or standards that impact the language used in certain domains. The update triggers 144 may include advancements in natural language processing (NLP) techniques or feature engineering methods that could enhance the performance of the sentiment analysis model.

In one or more embodiments, the sentiment pathways 146 are sequences of steps or rules used by the sentiment analysis engine 108 to understand, interpret, and appropriately respond to the sentiment or emotional state expressed by a user during a chat conversation. The sentiment pathways 146 may include sentiment patterns. The sentiment pathways 146 enable the chat manager 106 to handle emotions of a user effectively, providing empathetic and contextually appropriate responses. When a user interacts with the chat manager 106, the user may express positive, negative, or neutral sentiments, among others, through their language, tone, or choice of words.

In one or more embodiments, when a user expresses positive emotions, such as satisfaction, happiness, or grati-tude, the sentiment pathways 146 include acknowledgment and reinforcement. Example responses when detecting a positive user sentiment include, "I'm glad I could assist you! If you have any more questions, feel free to ask," or "Thank you for your kind words! We strive to provide the best service to our users." When a user expresses negative emotions, such as frustration or dissatisfaction, the sentiment pathways 146 may include a showing of empathy, apologizing if necessary, and offering solutions or escalating the conversation to a human agent. Example responses when detecting a negative user sentiment include, "I'm sorry to hear that you're experiencing difficulties. Let me see if I can help resolve the issue for you," or "I apologize for any inconvenience caused. If I'm unable to assist you, I can transfer you to a human agent who can provide further assistance." When a user sentiment is detected as being neutral or their intent is not clear, the sentiment pathways 146 include asking for clarification or offering general information to guide the conversation. Example responses when detecting a neutral user sentiment include, "I'm not sure I understand your question. Could you please provide more details?" or "Here's some general information that might be helpful. If you need more specific assistance, please let me know."

In one or more embodiments, the sentiment pathways 146 include responding to recognized emotional states. For example, when sentiment analysis determines that the user is getting frustrated, a response generated by the chat manager 106 may include, "I sense that you're feeling frustrated. I'll do my best to help resolve the issue." Similarly, when sentiment analysis determines that the user is getting agitated, a response generated by the chat manager 106 may include, "I understand this can be frustrating. Let's work together to find a solution." Implementation of sentiment pathways 146 requires continuous improvement and refinement based on user feedback and monitoring of chat conversations.

In one or more embodiments, the training data 148 includes the original training data for training the models used by the chat manager 106 and the sentiment analysis engine 108, and additional training data generated from the feedback provided by the users, human agents, and/or other personnel for further training the models. The training data 148 may include pairs of user queries or messages and their corresponding expected responses. The training data 148 aims to capture various scenarios and interactions that may occur during a chat conversation. The training data 148 is used to teach the chat manager 106 how to understand user inputs and generate appropriate and contextually relevant responses and to teach the sentiment analysis engine 108 how to predict user sentiment from conversation patterns and key words and phrases.

In one or more embodiments, the training data 148 is created by human annotators who generate a diverse range of user inputs and corresponding responses. The training data 148 may be collected from various sources, including historical chat logs, customer support transcripts, user surveys, or by employing human experts to simulate conversations. The training data may be representative of the target user interactions and covers a wide range of potential inputs and responses of various topics and scenarios that the chat manager 106 and/or sentiment analysis engine 108 is expected to handle. Additionally, the training data 148 can be augmented with techniques such as data synthesis or dialogue simulation to increase its diversity and coverage. Augmentation involves creating new training samples by applying transformations to existing data, such as paraphrasing sentences or introducing slight modifications.

In embodiments, when negative feedback is received, the training data 148 includes (a) messages comprising the conversation that was analyzed by the sentiment analysis model and (b) a sentiment label that is different from the sentiment that was predicted by the sentiment analysis model 128. For example, training data for a chat conversation that was unnecessarily transferred because the sentiment analysis model 128 predicted frustration or anger would include a sentiment label that is different than anger or frustration or simply be identified as "not angry" and/or "not frustrated". Similarly, training data for a chat conversation that was transferred too late because the sentiment analysis model 128 failed to predict frustration or anger would include a sentiment label of anger or frustration.

In embodiments, when positive feedback is received, the training data 148 includes (a) messages comprising the conversation that was analyzed by the sentiment analysis model and (b) a sentiment label that is the same as what was predicted by the sentiment analysis model 128. For example, training data for a chat conversation that was appropriately transferred because the sentiment analysis model 128 accurately predicted frustration or anger would include a sentiment label of frustration or anger. Similarly, training data for a chat conversation the system 100 refrained from transferring because the sentiment analysis model 128 accurately predicted no anger or frustration would be identified as "not angry" and/or "not frustrated".

In one or more embodiments, the training data 148 is sourced from publicly available sentiment analysis datasets. Popular publicly available sentiment analysis datasets include IMDb Reviews Dataset, Twitter Sentiment 140 Dataset, Amazon Product Reviews Dataset, and Yelp Reviews Dataset. Platforms that offer sentiment analysis APIs that provide labeled data include Google Cloud Natural Language API or Microsoft Azure Text Analytics API. Alternatively, datasets may be obtained by scraping data from social media platforms like Twitter, Facebook, or Reddit.

Figure 2A:
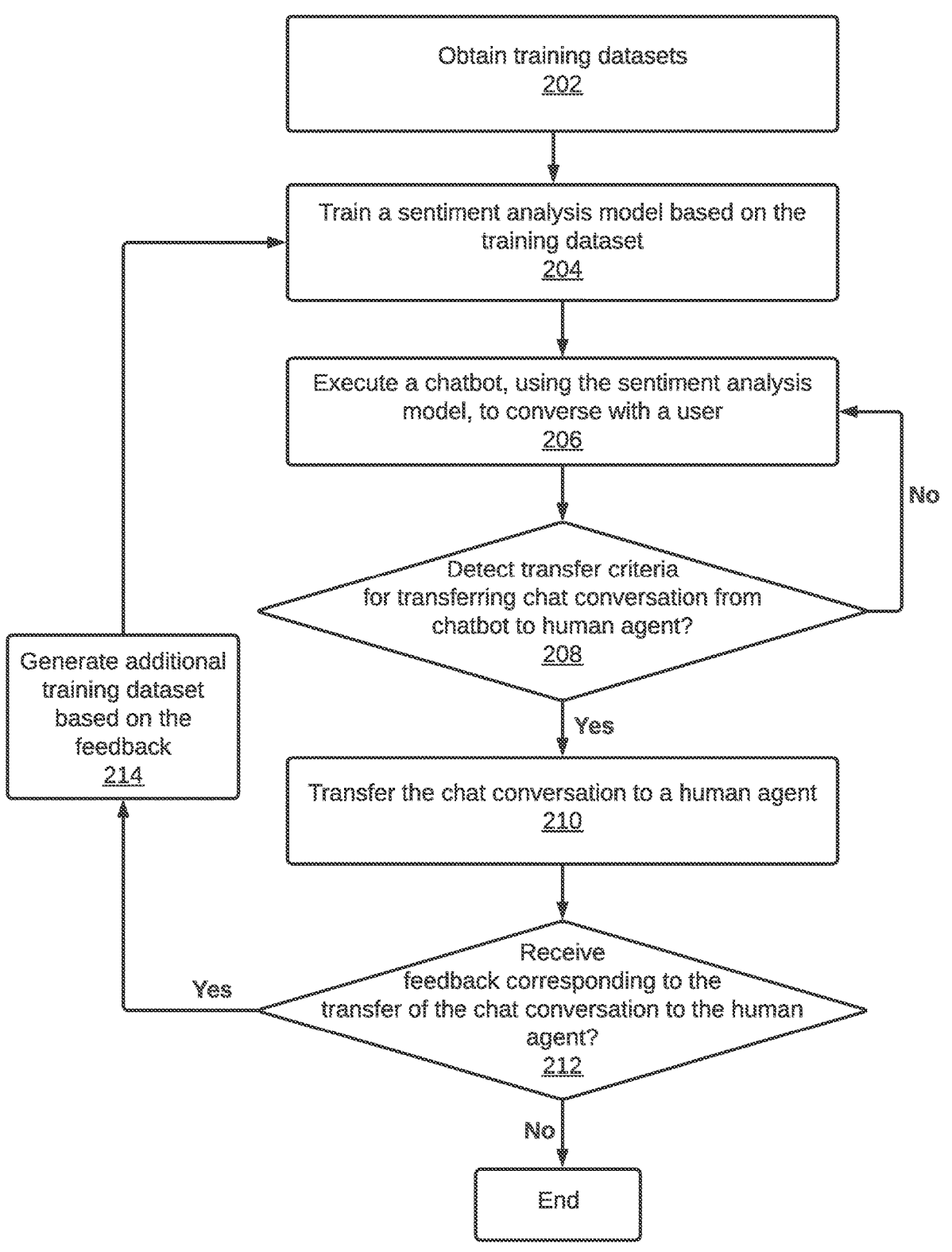
FIGS. 2A and 2B illustrate example sets of operations for using feedback for operations executed based on user sentiment predicted by a sentiment analysis model to update the sentiment analysis model in accordance with one or more embodiments.
Figure 2B:
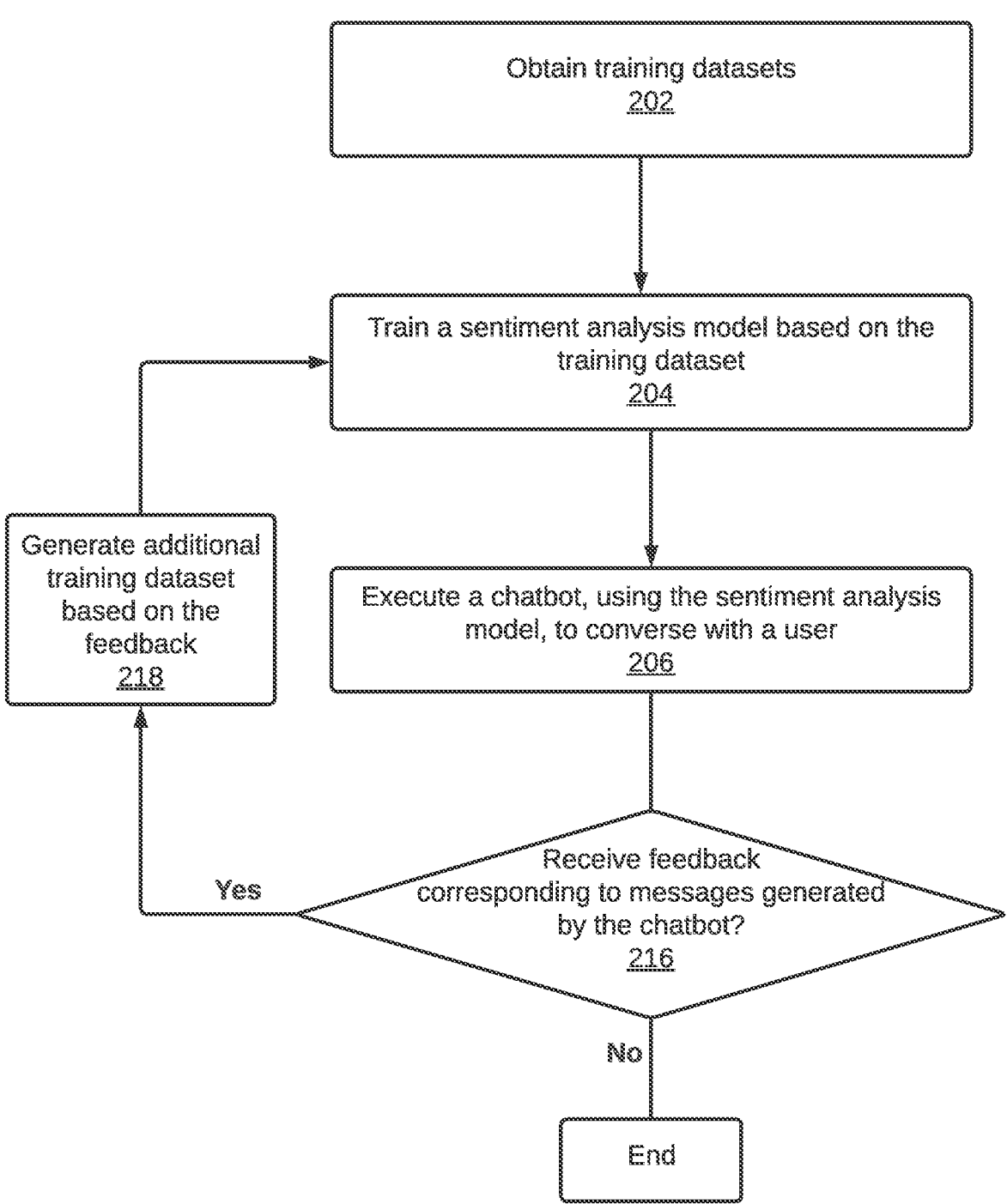

3. Updating a Sentiment Analysis Model Using Feedback for Operations Based on Predicted User Sentiment FIGS. 2A and 2B illustrate example sets of operations for updating a sentiment analysis model based on feedback for operations based on predictions of the sentiment analysis model in accordance with one or more embodiments. The operations of FIG. 2A relate to receiving feedback for transferring a chat conversation with a user from a chatbot to a human agent based on predicted user sentiment(s) that meets transfer criteria. The operations of FIG. 2B relate to feedback for responses generated by the chatbot based on predicted user sentiment. One or more operations illustrated in FIGS. 2A and 2B may be modified, rearranged, or omitted. Accordingly, the particular sequence of operations illustrated in FIGS. 2A and 2B should not be construed as limiting the scope of one or more embodiments.

One or more embodiments obtain training datasets (Operation 202). Obtaining training data for a sentiment analysis model may involve collecting or generating datasets that are labeled with sentiment labels, e.g., positive, negative, or neutral. Obtaining training datasets may include manually labeling datasets by reading and annotating text samples with the corresponding sentiment. The text samples may come from historical chat logs, customer support transcripts, and user surveys or by employing human experts to simulate conversations. Although time consuming, manual labeling ensures high-quality labeled data. Alternatively, or additionally, the training datasets may be sourced from publicly available sentiment analysis datasets, from platforms that offer sentiment analysis APIs, or from scraping data from social media platforms. The size of the dataset may be increased using augmentation techniques.

One or more embodiments train a sentiment analysis model based on the training dataset (Operation 204). Training a sentiment analysis model involves preparing the training dataset for use by the model. Preparing the training dataset includes ensuring that the training data is well-structured, for example, with a column for text samples and another for corresponding sentiment labels. Preprocessing steps may be taken to further prepare the data including lowercasing, removing stop words, and stemming/lemmatization. The text may then be converted into a numerical format suitable for machine learning algorithms. The training datasets may be split into training and testing sets. The training set is used to train the model, while the testing set helps evaluate its performance on unseen data.

One or more embodiments include selecting a sentiment analysis model for training. Common models include Naive Bayes, Support Vector Machines (SVM), and Deep Learning Models (e.g., LSTM, GRU, or Transformer-based models). The training datasets may then be used to train the selected model. Training the selected model may include adjusting the parameters of the model to minimize the difference between the predicted outputs and the true labels. For deep learning models, training typically involves defining the architecture, specifying the loss function, and optimizing with an optimizer. The testing dataset may be used to evaluate the performance of the model. Common evaluation metrics for testing the performance of the model may include accuracy, precision, recall, and F1 score. Training the sentiment analysis model may include adjusting hyperparameters and other techniques for fine-tuning the model.

One or more embodiments execute a chatbot using the sentiment analysis model to converse with a user (Operation 206). The chatbot may be a generative AI chatbot that uses natural language processing techniques to understand user input. The chatbot may use generative models to generate responses and post processing techniques to refine the responses. The chatbot may use sentiment analysis to predict and track the mood of the user. The predicted sentiment of the user may be used to generate responses that are responsive to the predicted real-time or near real-time sentiment of the user. The chatbot receives the service request from a user, engages the user to ascertain the type of service request, and gathers information for resolving the service request. The dialogue between the user and the chatbot may be conversational. The chatbot may converse with the user with the intent of resolving the user's request or with the intent of gathering all relevant information pertaining to the user's request.

One or more embodiments detect transfer criteria for transferring the chat conversation from chatbot to human agent (Operation 208), Transfer criteria may be directly or indirectly related to the user sentiment predicted by the sentiment analysis model. Transfer criteria may include the user explicitly requesting to speak with a human agent, the user asking for live assistance, or the user expressing frustration or dissatisfaction. The request to speak with a human agent need not be accompanied by a negative sentiment. Instead, the sentiment analysis model may be trained to identify keywords or phrases for understanding the request. Expressions of frustration or dissatisfaction may be accompanied by previously identified keywords or phrases of frustration or dissatisfaction. The choice of words, the tone of expression, and/or punctuation or capitalizing of words may be used by the sentiment analysis model to predict a negative sentiment.

In one or more embodiments, periodic or continuous sentiment analysis allows the chatbot to monitor the sentiment of the user throughout the conversation. Transfer criteria may include a particular sentiment or group of sentiments exceeding or falling below a specified threshold level. Similarly, the transfer criteria may include a particular user sentiment or multiple user sentiments remaining above or below a threshold level for a specified duration or exceeding a predetermined number of inbound messages. For example, a user sentiment may be predicted as being negative; however, the intensity of the negative sentiment may be low. Despite being low, transfer criteria may be met after a threshold amount of time of low negative sentiment or after a predetermined number of inbound messages including the low negative sentiment. A single instance of a negative user sentiment with high intensity and/or with a significant change to a previous user sentiment, e.g., within a single message, may be sufficient to meet transfer criteria.

One or more embodiments transfer the chat conversation to a human agent (Operation 210), When the system determines that the transfer criteria is met, the system may automatically transfer the chat conversation to the human agent. Alternatively, the system provides a signal to the human agent that the transfer criteria is met and may require affirmative action on the part of the human agent to complete the transfer.

One or more embodiments receive feedback corresponding to the transfer of the chat conversation to the human agent (Operation 212). When the chat conversation with the user is transferred from the chatbot to the human agent, either or both the user and the human agent receiving the chat conversation may be invited to provide feedback regarding the transfer. The user may receive interface elements for providing their feedback. The interface elements may correspond to a particular emotion, e.g., satisfied, annoyed, indifferent, agreement with the transfer, e.g., thumbs up/thumbs down, and/or a text box for a more detailed response. The interface elements may also provide the user an ability to identify a level or intensity of their emotion with the feedback. The human agent may be provided similar interface elements and text boxes for providing feedback. This feedback may be received in real-time, near real time, or at any time during the chat conversation.

In one or more embodiments, feedback is provided after completion of the chat conversation. Feedback provided after completion of the chat conversation may be received from the user, from the human agent that received the transfer of the chat conversation, and/or from other persons reviewing the chat conversation.

In one or more embodiments, the feedback provided by the user may be in the form of a survey. The survey may include questions related to the chat conversation. The survey may be written or oral. The survey may be completed immediately subsequent to completion of the chat conversation or after a period of time has lapsed. The survey may relate to the overall conversation and/or may be targeted to portions of the chat conversation. For example, a request for comment provided to the user may identify a portion of the chat conversation, e.g., inbound and outbound messages, that occurred immediately prior to transfer criteria being met and the chat conversation being transferred to the human agent. Alternatively, or additionally, the identified portions of the chat conversation may include instances where the confidence score of the predicted user sentiment was low or where an unexpected user sentiment was predicted. By targeting portions of the chat conversation associated with the predicted user sentiment, the feedback may be used to update the sentiment analysis model.

One or more embodiments generate additional training dataset (Operation 214). From the feedback provided by the user, the human agent, and/or the other personnel, an additional training dataset may be generated. The additional training set may be manually generated. Alternatively, or additionally, the additional training data may be computer generated. As with the training data used to initial train the sentiment analysis model, the size of the additional training data may be increased using augmentation techniques.

In another example of operations for updating a sentiment analysis model, one or more embodiments receive feedback corresponding to messages generated by the chatbot (Operation 216). During the chat conversation, one or more outbound messages are generated by the chatbot. The chatbot generates messages based, at least in part, on user sentiment(s) predicted by the sentiment analysis model. For example, the chatbot might generate a message with empathy when the sentiment analysis model predicts that the user is sad. Feedback may be provided by the user, the human agent, and/or a reviewer of the chat conversation for the generated message. Feedback may correspond to the appropriateness of the message generated by the chatbot. The sentiment analysis model may use the responses by the user to the outbound messages to predict user sentiment.

One or more embodiments generate additional training dataset based on the feedback (Operation 218). Feedback provided by the user, a human agent, and/or other personnel associated with the messages generated by the chatbot may be used to create additional training data. The additional training data may be used to update the training model.

4. Example Chat Conversation

A detailed example is described below for purposes of clarity. Components and/or operations described below should be understood as one specific example that may not be applicable to certain embodiments. Accordingly, components and/or operations described below should not be construed as limiting the scope of any of the claims.

Figure 3A:
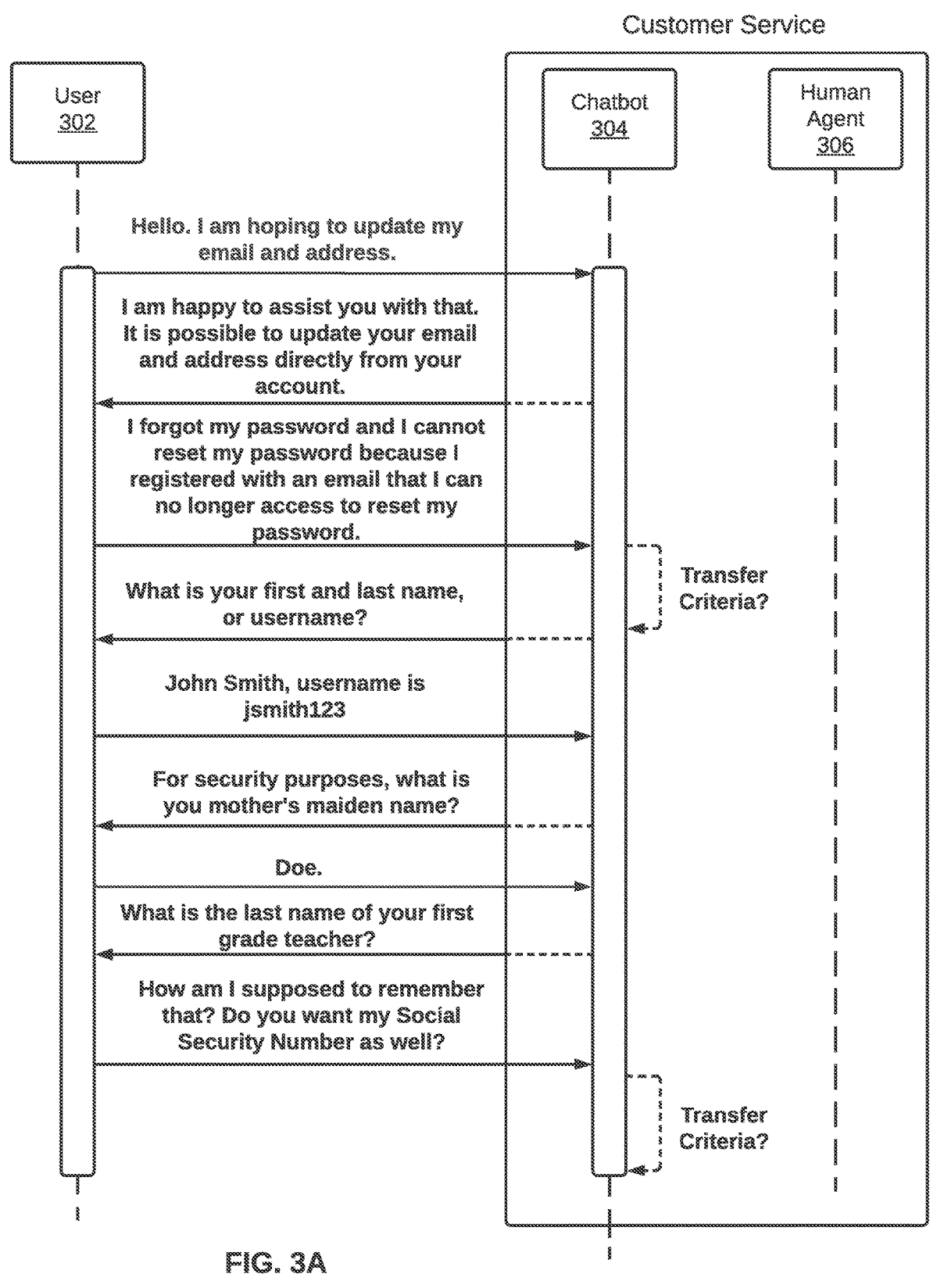
Figure 3B:
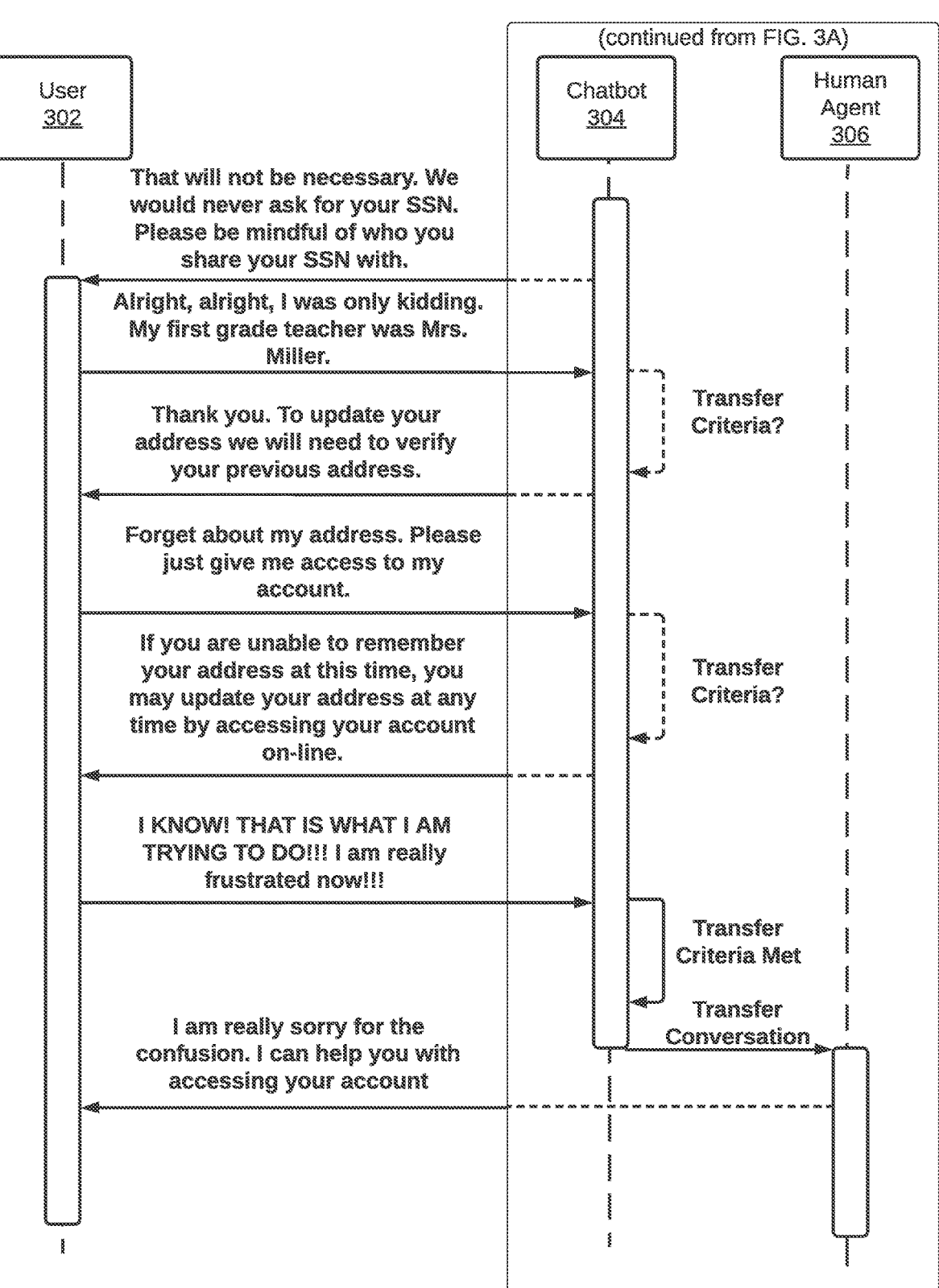

FIGS. 3A and 3B illustrate dialogue of a chat conversation comprising a service request. The chat conversation is between a user 302 and customer service, represented by a chatbot 304 and a human agent 306. From the perspective of the user 302, all responses are received from customer service, regardless of if they are generated by the chatbot 304 or prepared by the human agent 306. Similarly, all responses sent by the user 302 are perceived by the user 302 to be received by customer service regardless if they are received by the chatbot 304 or the human agent 306.

The chatbot 304 includes a sentiment analysis model predicting user sentiment throughout the chat conversation. A transfer analyzer monitors the predicted user sentiment throughout the chat conversation. The transfer analyzer initiates transfer of the chat conversation between the user 302 and the chatbot 304 when transfer criteria are met. Transfer criteria may include user sentiment exceeding a first, or high, threshold level, a significant or drastic change in user sentiment, or predicted user sentiment staying above a second, or low, threshold level for a predetermined duration. For example, when the sentiment analysis model predicts a user sentiment is below the first threshold level and above the second threshold level, transfer criteria is not met for immediate transfer. However, when the user sentiment remains above the second threshold level for multiple message or a predetermined duration of time, transfer criteria may be met and transfer of the chat conversation to a human agent may be initiated.

Initially, the user 302 indicates to customer service, e.g., chatbot 304, that they would like to update an email address and home address. The chatbot 304 acknowledges the request and suggests an alternative to using customer service to update the user information. The user 302 responds to the suggestion by the chatbot 304 that they are not able to login to their account because they have forgotten their password. The user 302 explains that they no longer have access to the email that was used to register the account, so they are unable to reset their password.

Based on the response of the user 302, the sentiment analysis model for the chatbot 304 predicted user sentiment for the first two inbound messages. The sentiment analysis model may have detected a change in user sentiment from the first message to the second message or an expression of frustration from the user 302. Using the predicted user sentiment for the first and second inbound messages, the transfer analyzer determines that the predicted user sentiment for the first two inbound messages does not meet transfer criteria. More particularly, the transfer analyzer determines that neither any change in user sentiment nor any level of frustration predicted by the sentiment analysis model meets transfer criteria. In this manner, the chat conversation continues between the user 302 and the chatbot 304.

The chat conversation continues with the chatbot 304 asking for the user's name and follows up with first and second security questions for authenticating the identity of the user 302. In response to the second security question, the user 302 appears to express frustration at the question being asked and makes a sarcastic comment, e.g., "Do you want my Social Security Number as well?" Based on the comment of the user 302, the sentiment analysis model detects the frustration expressed by the user 302. The transfer analyzer determines that the level of frustration predicted by the sentiment analysis model does not meet transfer criteria, and the conversation with the chatbot 304 continues.

Responding to the expression of frustration by the user 302, and without apparent understanding of the sarcasm expressed by the user 302, the chatbot 304 generates a response providing a pleasantry and words of caution regarding the social security number. The lack of understanding the message generated by the chatbot 304 in response to the sarcasm expressed by the user 302 appears to elicit additional frustration by the user 302. The user 302 expresses that they are no longer interested in updating their address and simply seek to access their account. Although user sentiment at this point may be increased, the transfer analyzer determines that the transfer criteria is not met, neither for exceeding the first threshold level, nor for the duration above the second threshold level, nor for a significant change in user sentiment from the previous message. The conversation with the chatbot 304 continues.

The chatbot 304 interprets the statement, "Forget about my address," by the user 302 to mean that the user 302 forgot their address. The chatbot 304 generates a message responding to the user about their forgotten address. This message from the chatbot 304 to the user 302 elicits an outburst from the user 302 indicating extreme frustration. The user 302 expresses their frustration through their words and actions, e.g., tone, volume, punctuation, and/or capital letters. The transfer analyzer determines that transfer criteria is met, and initiates transfer of the chat conversation to the human agent 306. The human agent 306 responds to the user 302 with an apology for the confusion and with an offer to help the user 302 access their account.

During the chat conversation and/or following the conclusion of chat conversation, either or both the user 302 and the human agent 306 may provide feedback regarding the chat conversation. More particularly, the user 302 and/or human agent 306 may provide feedback associated with the timing of the transfer to the human agent 306. The feedback may indicate that the transfer to the human agent 306 was initiated before it should have been or that the transfer to the human agent 306 should have been initiated earlier. The feedback may include when the user 302 and/or human agent 306 feels the transfer should have been initiated.

Feedback may also be provided by persons reviewing the chat conversation and/or by one or more machine learning models. Analysis of the chat conversation may indicate that the sentiment analysis model failed to determine that "forget about . . . " is not an indication that the user 302 forgot "something" but instead is an expression indicating that the user 302 no longer wishes to address the "something." Analysis of the chat conversation may also identify that "forget about . . . " is a negative sentiment.

Additional training data may be generated from the feedback and analysis of the feedback. The additional training data may be used to retrain the sentiment analysis model.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
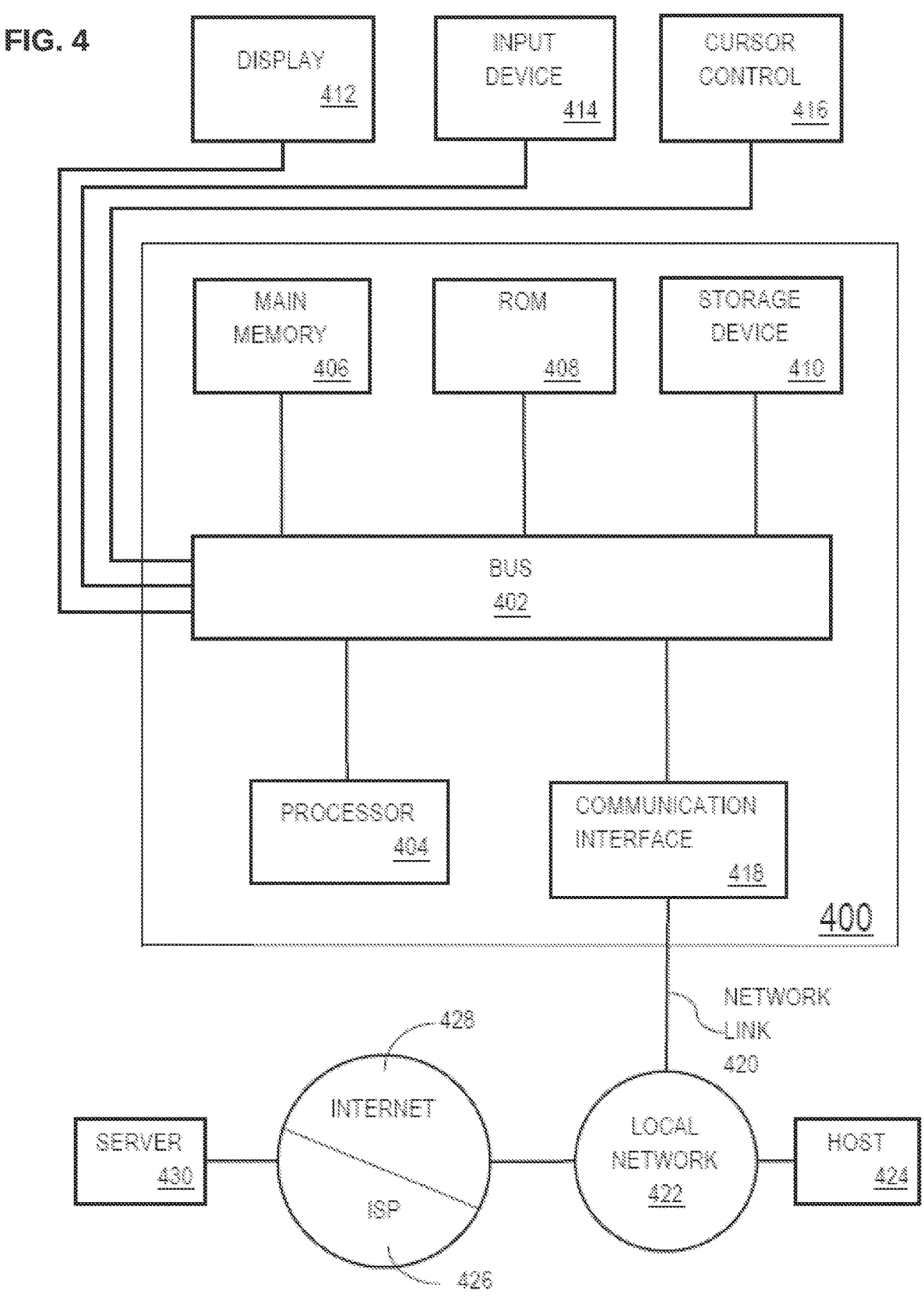
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

obtaining training datasets, wherein a first training dataset of the training datasets comprises:

a first chat conversation; and a first user sentiment of a first user in the first chat conversation;

training a sentiment analysis model based on the training datasets to predict user sentiments based on chat conversations;

executing a chatbot for engaging in a target chat conversation with a second user at least by transmitting outbound messages to a client device associated with the second user;

applying the sentiment analysis model to the target chat conversation to predict a second user sentiment of the second user in the target chat conversation;

based at least on the second user sentiment, detecting that one or more transfer criteria has been met to transfer the target chat conversation from the chatbot to a first human agent;

transferring the target chat conversation with the second user, from the chatbot to the first human agent;

receiving feedback corresponding to the transfer of the target chat conversation with the second user, from the chatbot to the first human agent, wherein the feedback indicates that (a) the transfer of the target chat conversation from the chatbot to the first human agent should have been executed at an earlier time than an actual execution time of the transfer or (b) the transfer of the target chat conversation from the chatbot to the first human agent should not have been executed;

based on the feedback, generating an additional training dataset for updating the sentiment analysis model, wherein generating the additional training dataset comprises:

identifying content in the target chat conversation for training the sentiment analysis model;

generating a corresponding sentiment label for the content, wherein the corresponding sentiment label comprises: (a) a negative sentiment label for when the transfer should have been executed at the earlier time and (b) a positive sentiment label for when the transfer should not have been executed; and including the content and the corresponding sentiment label in the additional training dataset;

retraining the sentiment analysis model based on the additional training dataset to generate an updated sentiment analysis model;

applying the updated sentiment analysis model to a second chat conversation between a third user and the chatbot to predict a third user sentiment of the third user in the second chat conversation;

based at least on the third user sentiment, detecting that one or more transfer criteria has been met to transfer the second chat conversation from the chatbot to a second human agent; and transferring the second chat conversation with the third user, from the chatbot to the second human agent.

2. The non-transitory computer readable media of claim 1, wherein prior to predicting the second user sentiment:

applying the sentiment analysis model to the target chat conversation to predict a fourth user sentiment of the second user in the target chat conversation;

based at least on the fourth user sentiment, detecting that the one or more transfer criteria has not been met to transfer the target chat conversation from the chatbot to the first human agent;

refraining from transferring, during a particular period of time, the chat conversation with the second user, from the chatbot to the first human agent;

receiving feedback corresponding to a lack of transfer of the target chat conversation during the particular period of time, from the chatbot to the first human agent;

based on the feedback, generating a second additional training dataset for updating the sentiment analysis model; and retraining the sentiment analysis model based on the second additional training dataset.

3. The non-transitory computer readable media of claim 1, wherein the additional training dataset is generated in response to:

receiving negative feedback for respective transfers of a set of chat conversations from chatbots to human agents, wherein the set of chat conversations meet a similarity criteria; and determining that an amount of the feedback for the respective transfers meets a retraining criteria.

4. The non-transitory computer readable media of claim 1, wherein prior to predicting the second user sentiment:

applying the sentiment analysis model to the target chat conversation to predict a fourth user sentiment of the second user in the target chat conversation;

based at least on the third user sentiment, generating an outbound message for transmission to the second user;

receiving feedback corresponding to an appropriateness of the outbound message;

based on the feedback, generating a second additional training dataset for updating the sentiment analysis model; and retraining the sentiment analysis model based on the second additional training dataset.

5. The non-transitory computer readable media of claim 1, wherein generating additional training data comprises:

using a generative AI model to generate additional messages that include content in inbound messages received during the target chat conversations, generating a label for the additional messages, and labeling the messages with a level of sentiment.

6. A method comprising:

obtaining training datasets, wherein a first training dataset of the training datasets comprises:

a first chat conversation;

a first user sentiment of a first user in the first chat conversation;

training a sentiment analysis model based on the training datasets to predict user sentiments based on chat conversations;

executing a chatbot for engaging in a target chat conversation with a second user at least by transmitting outbound messages to a client device associated with the second user;

applying the sentiment analysis model to the target chat conversation to predict a second user sentiment of the second user in the target chat conversation;

based at least on the second user sentiment, detecting that one or more transfer criteria has been met to transfer the target chat conversation from the chatbot to a first human agent;

transferring the target chat conversation with the second user, from the chatbot to the first human agent;

receiving feedback corresponding to the transfer of the target chat conversation with the second user, from the chatbot to the first human agent, wherein the feedback indicates that (a) the transfer of the target chat conversation from the chatbot to the first human agent should have been executed at an earlier time than an actual execution time of the transfer or (b) the transfer of the target chat conversation from the chatbot to the first human agent should not have been executed;

based on the feedback, generating an additional training dataset for updating the sentiment analysis model, wherein generating the additional training dataset comprises:

identifying content in the target chat conversation for training the sentiment analysis model;

generating a corresponding sentiment label for the content, wherein the corresponding sentiment label comprises: (a) a negative sentiment label for when the transfer should have been executed at the earlier time and (b) a positive sentiment label for when the transfer should not have been executed; and including the content and the corresponding sentiment label in the additional training dataset;

retraining the sentiment analysis model based on the additional training dataset to generate an updated sentiment analysis model;

applying the updated sentiment analysis model to a second chat conversation between a third user and the chatbot to predict a third user sentiment of the third user in the second chat conversation;

based at least on the third user sentiment, detecting that one or more transfer criteria has been met to transfer the second chat conversation from the chatbot to a second human agent; and transferring the second chat conversation with the third user, from the chatbot to the second human agent, wherein the method is performed by at least one device including a hardware processor.

7. The method of claim 6, wherein prior to predicting the second user sentiment:

applying the sentiment analysis model to the target chat conversation to predict a fourth user sentiment of the second user in the target chat conversation;

based at least on the third user sentiment, detecting that the one or more transfer criteria has not been met to transfer the target chat conversation from the chatbot to the first human agent;

refraining from transferring, during a particular period of time, the chat conversation with the second user, from the chatbot to the first human agent;

receiving feedback corresponding to a lack of transfer of the target chat conversation during the particular period of time, from the chatbot to the first human agent;

based on the feedback, generating a second additional training dataset for updating the sentiment analysis model; and retraining the sentiment analysis model based on the second additional training dataset.

8. The method of claim 6, wherein the additional training dataset is generated in response to:

receiving negative feedback for respective transfers of a set of chat conversations from chatbots to human agents, wherein the set of chat conversations meet a similarity criteria; and determining that an amount of the feedback for the respective transfers meets a retraining criteria.

9. The method of claim 6, wherein prior to predicting the second user sentiment:

applying the sentiment analysis model to the target chat conversation to predict a fourth user sentiment of the second user in the target chat conversation;

based at least on the third user sentiment, generating an outbound message for transmission to the second user;

receiving feedback corresponding to an appropriateness of the outbound message;

based on the feedback, generating a second additional training dataset for updating the sentiment analysis model; and retraining the sentiment analysis model based on the second additional training dataset.

10. The method of claim 6, wherein generating additional training data comprises:

using a generative AI model to generate additional messages that include content in inbound messages received during the target chat conversations, generating a label for the additional messages, and labeling the additional messages with a level of sentiment.

11. A system comprising:

at least one device including a hardware processor;

the system being configured to perform operations comprising:

obtaining training datasets, wherein a first training dataset of the training datasets comprises:

a first chat conversation; and a first user sentiment of a first user in the first chat conversation;

training a sentiment analysis model based on the training datasets to predict user sentiments based on chat conversations;

executing a chatbot for engaging in a target chat conversation with a second user at least by transmitting outbound messages to a client device associated with the second user;

applying the sentiment analysis model to the target chat conversation to predict a second user sentiment of the second user in the target chat conversation;

based at least on the second user sentiment, detecting that one or more transfer criteria has been met to transfer the target chat conversation from the chatbot to a first human agent;

transferring the target chat conversation with the second user, from the chatbot to the first human agent;

receiving feedback corresponding to the transfer of the target chat conversation with the second user, from the chatbot to the first human agent, wherein the feedback indicates that (a) the transfer of the target chat conversation from the chatbot to the first human agent should have been executed at an earlier time than an actual execution time of the transfer or (b) the transfer of the target chat conversation from the chatbot to the first human agent should not have been executed;

based on the feedback, generating an additional training dataset for updating the sentiment analysis model, wherein generating the additional training dataset comprises:

identifying content in the target chat conversation for training the sentiment analysis model;

generating a corresponding sentiment label for the content, wherein the corresponding sentiment label comprises: (a) a negative sentiment label for when the transfer should have been executed at the earlier time and (b) a positive sentiment label for when the transfer should not have been executed; and including the content and the corresponding sentiment label in the additional training dataset;

retraining the sentiment analysis model based on the additional training dataset to generate an updated sentiment analysis model;

applying the updated sentiment analysis model to a second chat conversation between a third user and the chatbot to predict a third user sentiment of the third user in the second chat conversation;

based at least on the third user sentiment, detecting that one or more transfer criteria has been met to transfer the second chat conversation from the chatbot to a second human agent; and transferring the second chat conversation with the third user, from the chatbot to the second human agent.

12. The system of claim 11, wherein prior to predicting the second user sentiment:

applying the sentiment analysis model to the target chat conversation to predict a fourth user sentiment of the second user in the target chat conversation;

based at least on the third user sentiment, detecting that the one or more transfer criteria has not been met to transfer the target chat conversation from the chatbot to the first human agent;

refraining from transferring, during a particular period of time, the chat conversation with the second user, from the chatbot to the first human agent;

receiving feedback corresponding to a lack of transfer of the target chat conversation during the particular period of time, from the chatbot to the first human agent;

based on the feedback, generating a second additional training dataset for updating the sentiment analysis model; and retraining the sentiment analysis model based on the second additional training dataset.

13. The system of claim 11, wherein the additional training dataset is generated in response to:

receiving negative feedback for respective transfers of a set of chat conversations from chatbots to human agents, wherein the set of chat conversations meet a similarity criteria; and determining that an amount of the feedback for the respective transfers meets a retraining criteria.

14. The system of claim 11, wherein prior to predicting the second user sentiment:

applying the sentiment analysis model to the target chat conversation to predict a fourth user sentiment of the second user in the target chat conversation;

based at least on the third user sentiment, generating an outbound message for transmission to the second user;

receiving feedback corresponding to an appropriateness of the outbound message;

based on the feedback, generating a second additional training dataset for updating the sentiment analysis model; and retraining the sentiment analysis model based on the second additional training dataset.

* * * * *